UNITED STATES PATENT OFFICE.

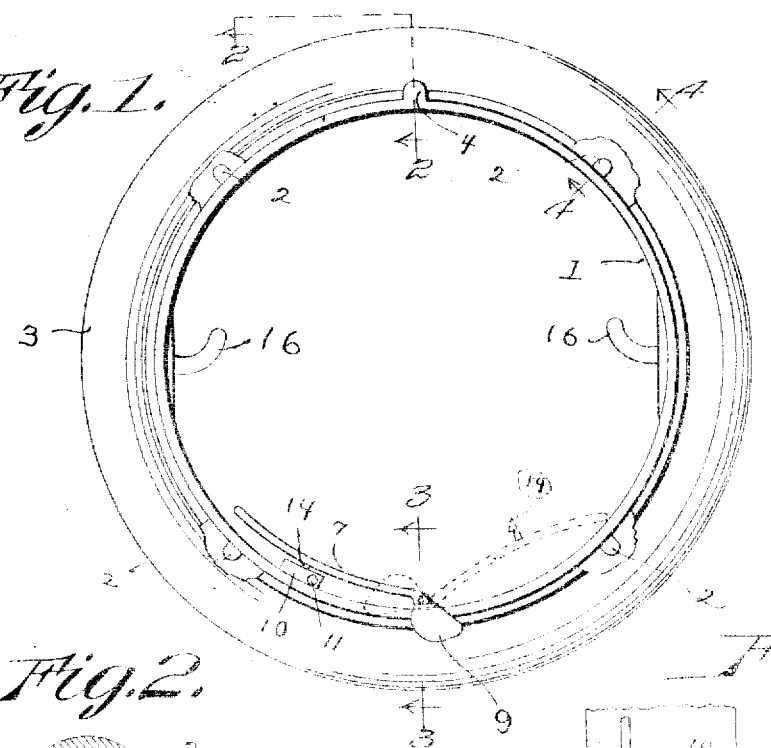

CHARLES M. JONES, OF NORTH YAKIMA, WASHINGTON.

TIRE-CARRIER.

1,267,228.    Specification of Letters Patent.    Patented May 21, 1918.

Application filed April 13, 1917. Serial No. 161,842.

*To all whom it may concern:*

Be it known that I, CHARLES M. JONES, a citizen of the United States of America, residing at North Yakima, in the county of Yakima and State of Washington, have invented certain new and useful Improvements in Tire-Carriers, of which the following is a specification.

The object of my invention is to provide a carrier for extra tires for an automobile, the construction of which carrier is such that it is simple, cheap of manufacture, but effective.

A further object of my invention is to provide a carrier of this character in which all of the parts are attached whereby the liability of lost parts is eliminated; with these and other objects in view my invention consists of the parts and combination of parts as will be hereinafter more fully set forth.

In the drawings:—

Figure 1 is a front elevation of tire carrier embodying my invention.

Fig. 2 is a transverse sectional view on the line 2—2 Fig. 1, looking in the direction of the arrow.

Fig. 3 is a sectional view on the line 3—3 Fig. 1, looking in the direction of the arrow.

Fig. 4 is a sectional view on the line 4—4 Fig. 1, looking in the direction of the arrow.

Fig. 5 is a detail plan view showing the lock on the rim.

The reference numeral 1 designates an endless rim which is provided on its rear edge with radially extending lugs 2 which serve and function as stops to limit the rearward movement of the tire 3 on the rim 1. The tire 3, in Fig. 1, is broken away so as to show the lugs 2. 4 is a lug extending radially from the top of the rim 1 and positioned at the other edge thereof as shown clearly in Fig. 2.

The tire 3, with or without the demountable rim 5 is hooked over the lug 4 at the top and then pushed rearwardly on the rim 1 until it engages the radially extending lugs 2 which limit the rearward movement of the tire.

At the bottom and on the inside face of the rim 1, I position a lug 6 to which is pivoted a lever 7, said lever having an arm 8 extending at right angles thereto from which depends a locking dog or cam 9 said cam or dog 9 extending beyond the periphery of the rim 1 so as to overlap the tire and demountable rim thereby firmly securing the tire and demountable rim on the rim 1 against accidental displacement. In order to lock the tire and its rim on the rim 1 against unauthorized removal, I mount on the inner face of the rim 1 a lock 10 provided with a manually operated spring catch plate 11, a key hole 12, and a key hole guard 13; I also provide the operating lever 7 with catch 14 which is adapted to pass through the opening 15 in the lock casing 10 and engage with the spring catch 11, said spring catch 11 being adapted to be securely locked against unauthorized movement by means of a suitable key.

The tire carrier is mounted on an automobile by means of the brackets 16.

From the above it will be seen that I have provided a very simple, but effective tire carrier in which all the parts are so connected that there is no danger of the parts being lost or misplaced and in which the tire is secured against loss or theft.

While I have shown the preferred embodiment of my invention it is to be understood that changes may be made therein without departing from the scope of my invention as outlined in the appended claims.

The cam 9 is disposed bodily at an angle to the edge of the rim so that if the tire is not pushed fully on the rim it will be crowded in on the rim by the wedging action of the cam as the lever is thrown to the left, or locked position.

What I claim is:—

1. In a tire carrier, the combination with a holder adapted to receive and support a demountable wheel rim and tire mounted thereon, and an abutment on said holder of a lever pivotally mounted on said holder to move in a plane substantially parallel to the tire, and means carried by one end of the lever being constructed to engage said tire and rim and exerting pressure on the tire and rim transversely of the holder toward said abutment when the lever is moved to locked position and means to lock said lever.

2. In a tire carrier, the combination with a holder, adapted to receive and support a demountable wheel rim and tire mounted thereon, and an abutment on said holder of a lever pivotally mounted on said holder to move in a plane substantially parallel to the tire, and a lug on one end of the lever eccentric to the pivot of the lever, and constructed to engage and lock said rim on the holder when the lever is moved to locked position.

3. In a tire carrier, the combination with a holder adapted to receive and support a demountable rim and tire mounted thereon, a plurality of radially disposed lugs at the rear edge of said holder constituting stops to limit the rearward movement of the said rim on said holder, a radially disposed lug at the top and on the front edge of the holder to constituting a stop to limit the forward movement of the rim on said holder and a lever pivoted to said holder to move in a plane substantially parallel to the tire, a lug eccentrically positioned on one end of said lever adapted to be moved to overlap the rim and tire and lock the rim and tire on the holder when the lever is moved to locked position.

4. In a tire holder, the combination with a circular holder, of a lever pivotally mounted on said holder, and a dog or cam depending from said lever and disposed at an oblique angle to the edge of the holder, whereby said dog exerts a wedging action on a tire placed on said holder, as the lever is moved to locking position.

In testimony whereof I affix my signature in the presence of two witnesses.

CHARLES M. JONES

Witnesses:
S. O. HAWKES,
M. C. JONES.